G. RUSIAS.
REAR END SIGNAL FOR VEHICLES.
APPLICATION FILED AUG. 24, 1917.
1,267,277.
Patented May 21, 1918.
2 SHEETS—SHEET 1.
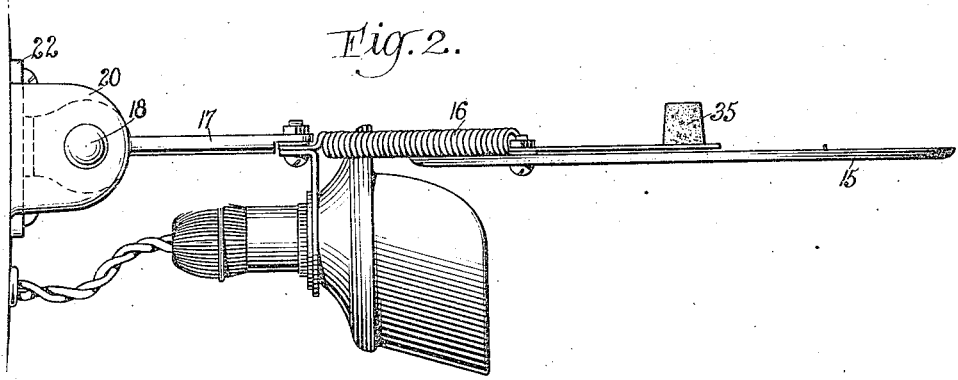
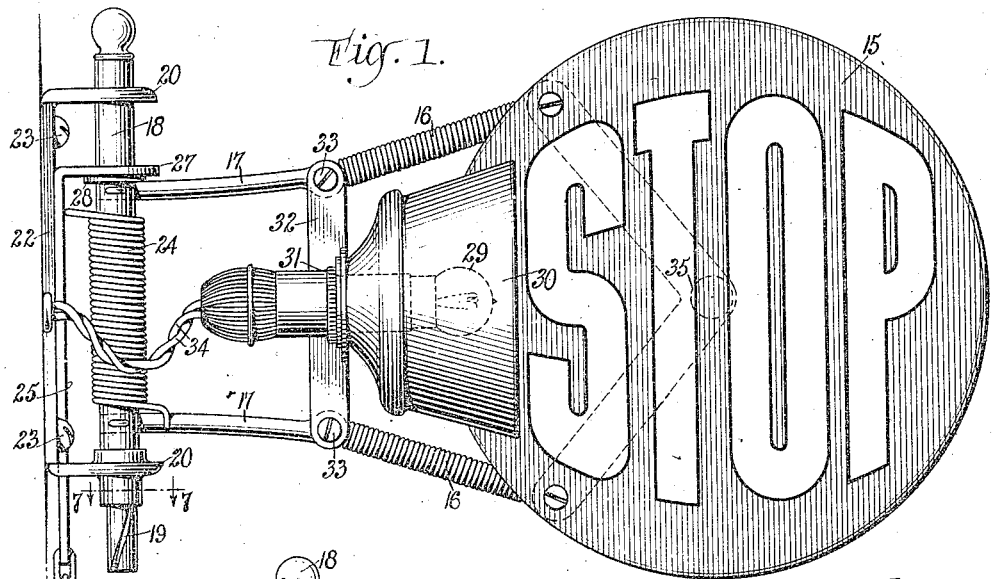
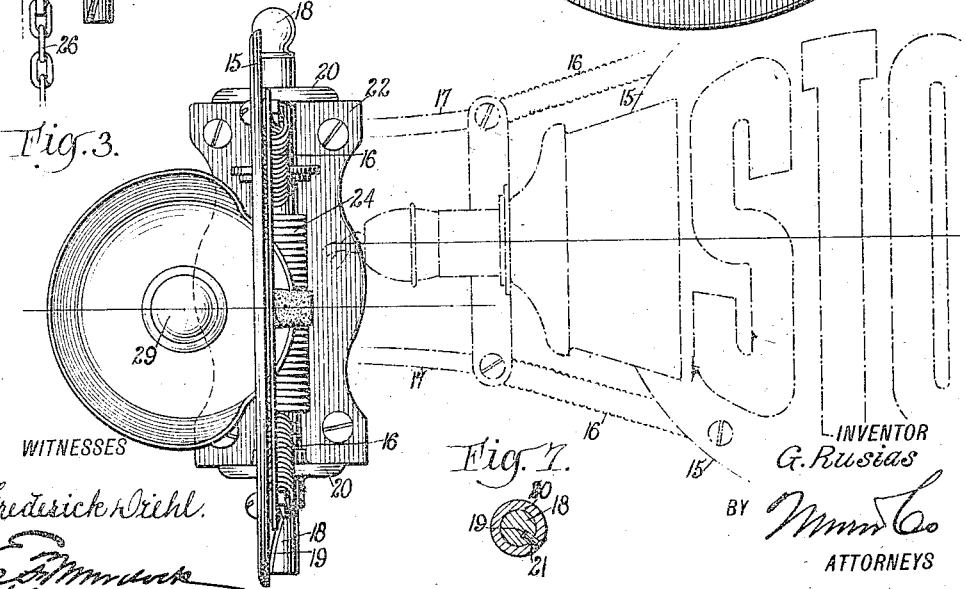
WITNESSES
INVENTOR
G. Rusias
BY
ATTORNEYS

G. RUSIAS.
REAR END SIGNAL FOR VEHICLES.
APPLICATION FILED AUG. 24, 1917.

1,267,277.

Patented May 21, 1918.
2 SHEETS—SHEET 2.

WITNESSES
Frederick Diehl.

INVENTOR
G. Rusias
BY
ATTORNEYS

UNITED STATES PATENT OFFICE.

GABRIEL RUSIAS, OF HABANA, CUBA.

REAR-END SIGNAL FOR VEHICLES.

1,267,277.   Specification of Letters Patent.   Patented May 21, 1918.

Application filed August 24, 1917. Serial No. 187,987.

*To all whom it may concern:*

Be it known that I, GABRIEL RUSIAS, a citizen of the Republic of Cuba, and a resident of Habana, Cuba, have invented a new and Improved Rear-End Signal for Vehicles, of which the following is a full, clear, and exact description.

Among the principal objects which the present invention has in view are: to provide a simple means for indicating a warning in traffic; to employ a single device for indicating various intentions with reference to the traffic; to provide a structure difficult to damage; and to provide means for operating the signal in correspondence with the operation of an automobile with which the signal is associated.

Drawings.

Figure 1 is a rear elevation of one of the signal apparatuses shown in the active position thereof;

Fig. 2 is a top plan view of the same;

Fig. 3 is a side edge view of the same, and showing in connection therewith by dotted lines, the inactive position of the signal;

Fig. 7 is a cross section of a portion of the signaling apparatus, the section being taken as on the line 7—7 in Fig. 1.

Figure 4:
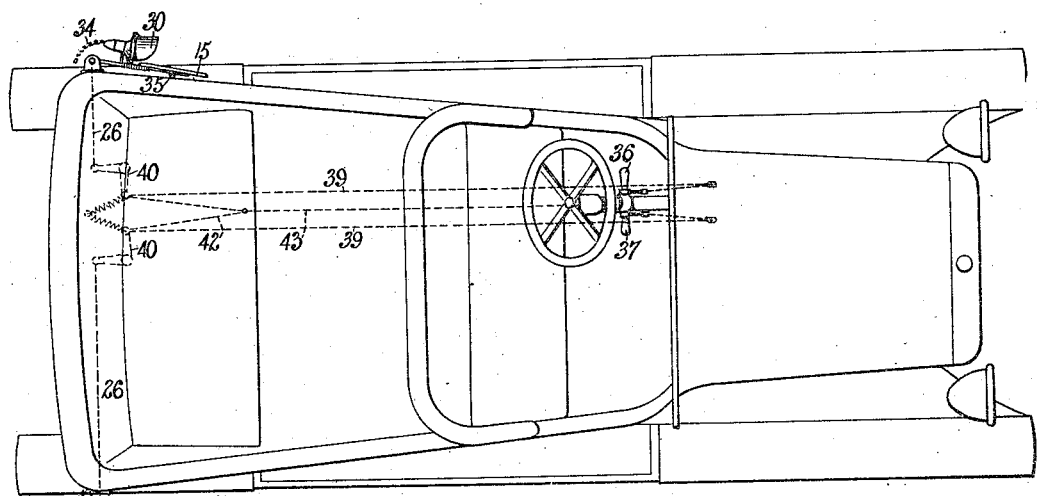
Fig. 4 is an outline view of an automobile showing a signal mechanism of the character mentioned constructed and arranged in accordance with the present invention, the signal apparatus at one side of the automobile being shown in active position, and the signal at the opposite side being shown in inactive position.

Description.

As seen in the drawings, the signal apparatus embodies a target 15, the field whereof is preferably of a solid color having an inscription, such as the word "Stop" imprinted thereon, the inscription being in a distinctive color. The target is preferably round and is mounted on resilient arms 16. The arms 16 are preferably constructed of closely coiled spring wire. The object of this construction is that if when the targets are extended they are struck, the arms 16 will yield and prevent damage to the apparatus. The inner ends of the arms 16 are rigidly connected with the target arms 17. The target arms 17 are rigidly connected with rotary standards 18.

The standards 18 have formed therein spiral grooves 19, and have sliding bearings in brackets 20. In the lower bracket 20 and extending into the groove 19, is a guide pin 21. The brackets 20 are rigidly connected with a face plate 22 in active service to the side of an automobile adjacent the rear thereof, by fasteners, such as the screws 23. The normal or inactive position shown in dotted lines in Fig. 3 of the drawings, is maintained by a coil spring 24, one free end whereof bears against the face plate 22, and the other free end against one of the arms 17.

When a standard 18 is depressed, the groove 19 riding over the pin 21 rotates the said standard on its axis and gyrates the arm 17 and target 15 connected therewith. The movement of the standard 18 is regulated by a suitable stop member. This is caused by a slide plate 25. The slide plate 25 is suitably held on the face plate 22 and has attached to the lower end thereof, a pull chain 26. In the action of the apparatus, whenever the pull chain 26 is drawn, the slide plate 25 is depressed and the bracket arm 27 bears upon the flange plate 28, or a friction-reducing bearing between the said bracket and flange plate 28. The pull on the chain 26 is exerted through the medium of certain manually-operated devices adjacent the driver's station in the automobile as hereinafter set forth.

In the daylight the difference in color between the field of the target 15 and the inscription thereon is sufficient to be seen by a person driving a following automobile. At night, the face of the target is illuminated by an electric globe 29. The globe 29 is covered by a shield 30, so arranged that the light of the globe may not be viewed from the rear of the automobile on which it is applied, when the device is in the inactive position. The globe 29 and parts associated therewith are supported in brackets 31 and cross bars 32. The bars 32 extend between the arms 17 and are joined therewith by means of screws 33. Electricity is supplied to the globe 29 from any suitable source and by means of wires 34.

When the pulling strain is released on the chains 26, the springs 24 rapidly rotate the standards 18 and parts associated therewith. To save the targets 15 and parts with which the same are brought in contact, each target is provided with a cushion button 35.

Figure 5:
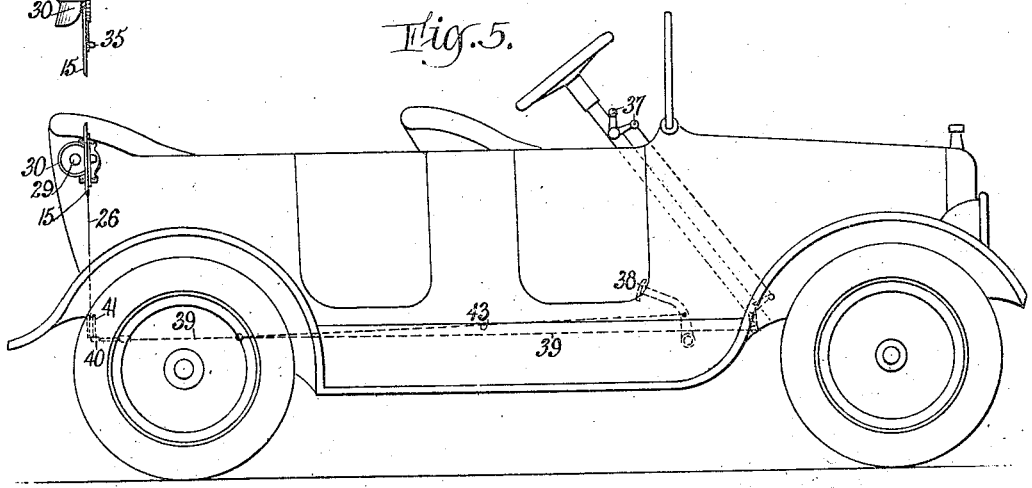
Fig. 5 is a side view in outline of the car and of the signal apparatus in active position thereon.
Figure 6:
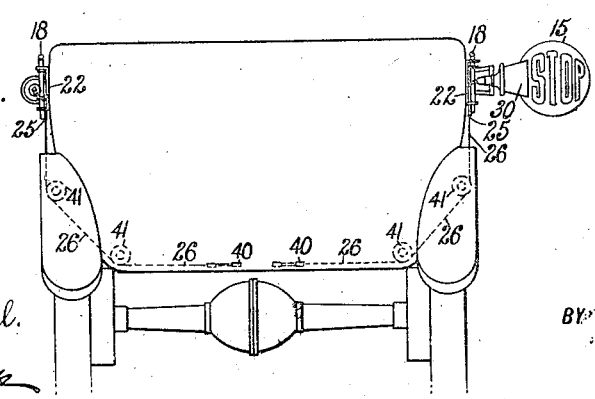
Fig. 6 is a rear elevation of the car showing the signals in the positions outlined in the above described figures.

As seen best in Fig. 4 to 6, inclusive, the targets 15 and parts associated therewith are operated to be moved to the active positions thereof by means of levers 36 and 37, and a foot brake 38. As shown best by dotted lines in Fig. 4 of the drawings, the lever 36 and 37 are operatively connected with the slide plates 25 by means of flexible lines 39, bell crank levers 40, and pull chains 26. As seen best in Fig. 6 of the drawings, the chains 26 are rove over guide pulleys 41. The end of each bell crank lever 40 is connected independently with one of the levers 36 and 37. By this means, the driver may operate the lever 36 or 37, which moves the target 15 on the side of the automobile in the direction which he intends to turn. If it is the right-hand side of the automobile, he will operate the lever 37, with the effect as shown best in Fig. 4 of the drawings, that the target 15 on the right-hand side of the automobile will be extended. In this position, the target may be seen in the daytime without the use of the lamp or globe 29. In the nighttime, the globe 29 throwing its rays on the target, discloses it to the driver of the following automobile.

The same is true of the target 15 at the left-hand side of the automobile. This would be operated through the medium of the lever 36.

The levers 36 and 37 are conveniently placed and at the option of the driver or designer.

As shown best in Fig. 4 of the drawings, the power-connected ends of the levers 40 are connected by a bridle 42, to a line 43, which is operatively connected with the foot brake 38. The foot brake 38 is applied only when stopping or checking the speed of the automobile. In either case, when the foot brake is applied, the line 43 is drawn, with the result that the levers 40 are simultaneously rocked and the pull chains 26 drawn upon, to the effect that the targets 15 at both sides of the automobile are extended.

It is obvious that the operation of the targets 15 in the above manner bears such a close resemblance to the usual targets of hand-signaling from an automobile, as to require no education or instruction. It would be natural for the driver of a following automobile or other vehicle who sees the signal at one side of the preceding automobile, which ordered him to stop, to turn to the side where the warning did not occur. Likewise, it would be perfectly natural for the said driver to understand when he sees signals at both sides of the automobile giving the same warning, that a full stop or a cautious approach is necessary.

*Claims.*

1. In a rear-end signal for vehicles, a signal apparatus embodying a target, means for pivotally mounting the same on the side of a vehicle, yielding supports for said target for normally maintaining the extended position of said target for permitting the target to yield to pressure applied thereto, and an electric lamp arranged to illuminate the face of said target in all positions thereof.

2. In a rear-end signal for vehicles, a signal apparatus embodying a target, means for pivotally mounting the same on the side of a vehicle, yielding supports for said target for normally maintaining the extended position of said target for permitting the target to yield to pressure applied thereto, and an electric lamp arranged to illuminate the face of said target in all positions thereof; a pivoted standard for said target and associated parts, said standard having a spiral groove; manually operated means for depressing said standard; and a stationary guide pin fitting in said groove for rotating said standard.

3. In a rear-end signal for vehicles, a signal apparatus embodying a target, means for pivotally mounting the same on the side of a vehicle, yielding supports for said target for normally maintaining the extended position of said target for permitting the target to yield to pressure applied thereto, and an electric lamp arranged to illuminate the face of said target in all positions thereof; a pivoted standard for said target and associated parts, said standard having a spiral groove; manually-operated means for depressing said standard; a stationary guide pin fitting in said groove for rotating said standard; and a coil spring adapted to retractively rotate said standard when released from manual control.

GABRIEL RUSIAS.